US012176669B2

(12) United States Patent
Gebhardt

(10) Patent No.: US 12,176,669 B2
(45) Date of Patent: Dec. 24, 2024

(54) CONNECTION ARRANGEMENT, CONNECTION TERMINAL AND ELECTRONIC DEVICE

(71) Applicant: Phoenix Contact GmbH & Co. KG, Blomberg (DE)

(72) Inventor: Martin Gebhardt, Porta Westfalica (DE)

(73) Assignee: PHOENIX CONTACT GMBH & CO. KG, Blomberg (DE)

(*) Notice: Subject to any disclaimer, the term of this patent is extended or adjusted under 35 U.S.C. 154(b) by 230 days.

(21) Appl. No.: 17/632,243

(22) PCT Filed: Aug. 4, 2020

(86) PCT No.: PCT/EP2020/071882
§ 371 (c)(1),
(2) Date: Feb. 2, 2022

(87) PCT Pub. No.: WO2021/028263
PCT Pub. Date: Feb. 18, 2021

(65) Prior Publication Data

US 2022/0336971 A1 Oct. 20, 2022

(30) Foreign Application Priority Data

Aug. 9, 2019 (DE) ..................... 10 2019 121 581.1

(51) Int. Cl.
*H01R 4/48* (2006.01)

(52) U.S. Cl.
CPC ..... *H01R 4/48365* (2023.08); *H01R 4/48455* (2023.08)

(58) Field of Classification Search
CPC ........................... H01R 4/4809; H01R 4/4821; H01R 4/48275; H01R 4/4828; H01R 4/4833;
(Continued)

(56) References Cited

U.S. PATENT DOCUMENTS

| | | | | |
|---|---|---|---|---|
| 8,251,738 B2 * | 8/2012 | Heckert | ............ | H01R 4/48365 439/441 |
| 9,466,911 B1 * | 10/2016 | Wu | .................... | H01R 4/48365 |

(Continued)

FOREIGN PATENT DOCUMENTS

| | | |
|---|---|---|
| CN | 203166134 U | 8/2013 |
| DE | 3019149 C2 | 5/1983 |

(Continued)

*Primary Examiner* — Renee S Luebke
*Assistant Examiner* — Paul D Baillargeon
(74) *Attorney, Agent, or Firm* — LEYDIG, VOIT & MAYER, LTD.

(57) ABSTRACT

A connection arrangement for connecting an electrical conductor includes: a busbar; a clamping spring by which the conductor to be connected is clamped in a clamping position of the clamping spring against the busbar; and an actuating element by which the clamping spring can be moved from the clamping position into an open position. A holding element is provided which, in the open position, engages with the actuating element to hold the actuating element in position. The holding element has a pressure surface. For moving the clamping spring from the open position into the clamping position, the pressure surface can be actuated by the conductor to be connected and the holding element can be disengaged from the actuating element by the actuation of the pressure surface.

24 Claims, 5 Drawing Sheets

(58) Field of Classification Search
CPC . H01R 4/4835; H01R 4/48365; H01R 4/4837
See application file for complete search history.

(56) References Cited

U.S. PATENT DOCUMENTS

| | | | | |
|---|---|---|---|---|
| 10,193,244 | B2 * | 1/2019 | Aboulkassem .... | H01R 4/48365 |
| 10,340,613 | B2 * | 7/2019 | Geske ................ | H01R 4/48455 |
| 2017/0352980 | A1 | 12/2017 | Stuckmann | |
| 2019/0319374 | A1 | 10/2019 | Herrmann et al. | |

FOREIGN PATENT DOCUMENTS

| | | | |
|---|---|---|---|
| DE | 102004001202 | A1 | 7/2004 |
| DE | 102014119030 | A1 | 6/2016 |
| DE | 202016102959 | U1 | 9/2017 |
| DE | 202016105826 | U1 | 1/2018 |
| DE | 202018102218 | U1 | 7/2019 |
| WO | WO 2017207429 | A2 | 12/2017 |

* cited by examiner

CONNECTION ARRANGEMENT, CONNECTION TERMINAL AND ELECTRONIC DEVICE

CROSS-REFERENCE TO PRIOR APPLICATIONS

This application is a U.S. National Phase application under 35 U.S.C. § 371 of International Application No. PCT/EP2020/071882, filed on Aug. 4, 2020, and claims benefit to German Patent Application No. DE 10 2019 121 581.1, filed on Aug. 9, 2019. The International Application was published in German on Feb. 18, 2021 as WO 2021/028263 under PCT Article 21(2).

FIELD

The invention relates to a connection arrangement for connecting an electrical conductor, comprising a busbar, a clamping spring by means of which the conductor to be connected is clamped against the busbar in a clamping position of the clamping spring, and an actuating element by means of which the clamping spring can be moved from the clamping position to an open position. The invention further relates to a connecting terminal having at least one connection arrangement designed in this way. The invention further relates to an electronic device.

BACKGROUND

Such connection arrangements usually have a clamping spring designed as a leg spring, which clamping spring has a retaining leg and a clamping leg, wherein a conductor inserted into the connection arrangement can be clamped against the busbar by means of the clamping leg of the clamping spring. If, in particular, flexible conductors are clamped, prior to insertion of the conductor the clamping spring must already be moved to an open position by means of the actuating element and thus actuated in order to pivot the clamping spring or the clamping leg away from the busbar so that the conductor can be inserted into the intermediate space between the busbar and the clamping spring. Only with rigid and thus stable conductors can the conductor apply sufficient force to the clamping spring or the clamping leg of the clamping spring in order to be able to pivot the clamping leg away from the busbar without the actuating element having to be actuated by a user for this purpose. With flexible conductors, the user must first pivot the clamping spring away from the busbar by actuating the actuating element so that the flexible conductor can be inserted. In order to clamp the inserted conductor, the actuating element must be manually actuated once more by the user in order to move the clamping spring from the open position into the clamping position. Actuation of the actuating element by the user makes mounting or connecting the conductor difficult for the user, because handling is cumbersome and the time required thus increases as well.

SUMMARY

In an embodiment, the present invention provides a connection arrangement for connecting an electrical conductor, comprising: a busbar; a clamping spring by which the conductor to be connected is clamped in a clamping position of the clamping spring against the busbar; an actuating element by which the clamping spring can be moved from the clamping position into an open position; and a holding element which, in the open position, engages with the actuating element to hold the actuating element in position, wherein the holding element has a pressure surface, and wherein, for moving the clamping spring from the open position into the clamping position, the pressure surface can be actuated by the conductor to be connected and the holding element can be disengaged from the actuating element by the actuation of the pressure surface.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
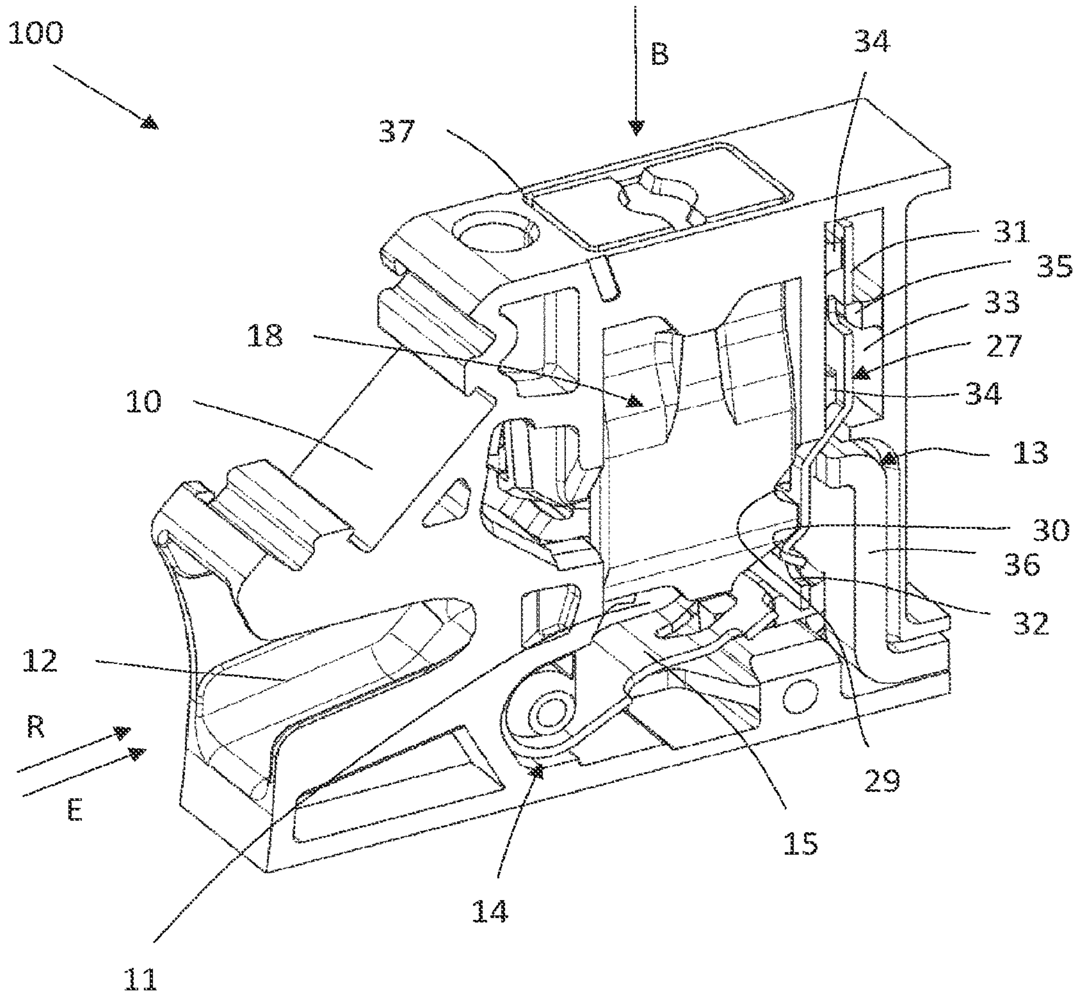
FIG. 1 shows a schematic representation of a connection arrangement according to the invention in a perspective view.

In an embodiment, the present invention provides a connection arrangement, a connecting terminal and an electronic device in which the connection of, in particular, flexible conductors can be simplified.

The connection arrangement according to the invention is characterized in that a holding element is provided which, in the open position, engages with the actuating element to hold the actuating element in position, wherein the holding element has a pressure surface, wherein, for the purpose of moving the clamping spring from the open position into the clamping position, the pressure surface can be actuated by the conductor that is to be connected and by actuation of the pressure surface the holding element can be disengaged from the holding element.

By means of the connection arrangement according to the invention, a flexible conductor can now also be connected without a manual actuation of the actuating element and be clamped against the busbar. The clamping spring is preferably designed as a leg spring which has a retaining leg and a clamping leg designed to be pivoted relative to the retaining leg. By means of a pivoting movement of the clamping leg, the clamping leg can be moved into an open position, in which the clamping leg is arranged at a distance from the busbar and a conductor that is to be connected can be inserted into an intermediate spaceformed thereby between the busbar and the clamping leg, or can be guided out of it, and can be moved into a clamping position in which the clamping leg can bear against the busbar or against the connected conductor in order to clamp the conductor against the busbar. The connection arrangement has a holding element which, in the open position of the clamping spring, engages with the actuating element in such a way that the actuating element remains in the open position without additional manual actuation, so that the clamping spring or the clamping leg of the clamping spring is held in the open position via the actuating element in such a way that, in particular, a flexible conductor can be inserted into the intermediate space formed thereby between the busbar and the clamping spring. The actuating element can thus in the open position be latched with the holding element. The holding element has a pressure surface which is arranged aligned with a region for insertion of the conductor into the connection arrangement and thus in extension of a conductor insertion opening of the connection arrangement, so that the conductor abuts the pressure surface of the holding element when inserted into the connection arrangement. By applying a compressive force to the pressure surface by means of the conductor, the holding element can be brought into a pivoting movement or tilting movement in the direction of the insertion direction of the conductor, so that the holding element can be pivoted or tilted away from the actuating element in the insertion direction of the conductor. As a result of the pivoting movement of the holding element, the holding element can be disengaged from the actuating element and thus released from the actuating element, so that the actuating element and thus the clamping spring can be moved from the open position into the clamping position without manual aid. By means of this special mechanism, a flexible conductor can be connected simply by the insertion movement of the conductor, without a user having to actuate further elements, such as the actuating element, on the connection arrangement in order to release the clamping spring and move it from the open position into the clamping position. This facilitates the handling of the connection arrangement and saves time when connecting a conductor. In order to release the conductor to be connected from the clamping position again, the clamping leg of the clamping spring can be pivoted back away from the busbar by means of the actuating element until the open position is reached and the actuating element engages with the holding element in order to hold the actuating element and, via the actuating element, the clamping spring in this open position. The holding element is preferably an element or component which is formed separately from the clamping spring and the busbar and which can be arranged in a conductor connection chamber of the connection arrangement.

It is preferably provided that the actuating element for moving the clamping spring into the clamping position and into the open position can be guided along a direction of movement which is transverse to an actuating direction of the pressure surface of the holding element by the conductor to be connected. The connection arrangement is thus preferably designed such that the actuating direction or the direction of movement of the actuating element is formed transversely or perpendicularly to the insertion direction of the conductor into the connection arrangement. A channel formed in a housing of the connection arrangement in which the actuating element can be guided is thus preferably formed transversely or perpendicularly to a conductor insertion opening formed in this housing. As a result, the conductor can be inserted over a side surface of the housing on which the actuating element is not positioned so that an inadvertent actuation of the actuating element when connecting and thus when inserting the conductor into the housing can be avoided. The direction of movement of the actuating element is preferably designed purely translational, so that the actuating element can be moved along its longitudinal axis.

In such a design of the direction of movement of the actuating element relative to the actuating direction of the pressure surface by the conductor to be connected, it is preferably provided that the pressure surface of the holding element is arranged behind the actuating element in the actuating direction. In order to actuate the pressure surface, the conductor to be connected must then be pushed in far enough that the conductor must be inserted into the connection arrangement beyond the actuating element. This ensures that no undesired actuation of the pressure surface and thus an undesired release of the actuating element and thus of the clamping spring from the open position takes place if the conductor has not yet been inserted far enough into the connection arrangement. Such an arrangement of the holding element makes it possible to ensure that the actuating element and thus the clamping spring is moved from the open position into the clamping position only when the conductor is inserted far enough in, and in the desired connection position lies between the clamping spring or the clamping leg of the clamping spring and the busbar.

In order to be able to get past the conductor to be connected on the actuating element, the actuating element can have a free space for leading the conductor to be connected through toward the pressure surface of the holding element. The free space can take the form of a recess on the actuating element. The free space formed on the actuating element is preferably formed aligning with the pressure surface of the holding element in the actuating direction of the conductor.

The clamping spring can have a clamping leg with a clamping tab and with at least one lateral tab arranged to the side of the clamping tab, wherein a clamping edge for clamping the conductor against the busbar can be formed at a free end of the clamping tab, and wherein the actuating element can interact with the at least one lateral tab to actuate the clamping spring. The actuation of the clamping leg by means of the actuating element can thus take place via a side tab of the clamping leg, which is provided in addition to the clamping tab of the clamping leg on which the clamping edge is formed. The function of actuating the clamping leg by means of the actuating element can thus be separated from the clamping of the conductor to be connected via the clamping tab of the clamping leg. The lateral tab preferably runs parallel to the clamping tab. The lateral tab preferably forms an outer edge of the clamping leg. A free space or gap is preferably formed between the lateral tab and the clamping tab, so that the lateral tab is preferably formed at a distance from the clamping tab, wherein it is preferably integrally connected to the clamping tab at a free end of the lateral tab.

In relation to the at least one lateral tab, the clamping tab is preferably formed in such a way that the clamping tab can project beyond the at least one lateral tab in the longitudinal direction of the clamping leg. The actuation surface of the actuating element formed by the lateral tab can thus be set back on the clamping leg in relation to the clamping edge of the clamping leg in the direction of the flexural joint of the clamping spring which connects the clamping leg to the retaining leg.

The actuating element preferably has at least one actuating section by means of which the actuating element can actuate the clamping leg. The actuation section preferably interacts with the at least one lateral tab of the clamping leg. The actuating section thus preferably forms an outer side or an outer wall of the actuating element, which can simultaneously form a lateral guide of the conductor to be connected. The actuating section can preferably be designed as an actuating finger.

The clamping leg can have a second lateral tab arranged to the side of the clamping tab, wherein the clamping tab can be positioned between the first lateral tab and the second lateral tab. The clamping leg of the clamping spring can thus be designed symmetrically with both lateral tabs and the clamping tab. The actuating element can thus act on the clamping leg on both sides of the clamping tab via the two lateral tabs during an actuation process, so that a particularly uniform distribution of force on the clamping leg of the clamping spring can be achieved by means of the actuating element.

The actuating element preferably has two actuation sections arranged opposite one another which can interact with the two lateral tabs to actuate the clamping spring, wherein a free space for through-passage of the conductor to be connected can be formed between the two actuating sections. If the clamping leg has two lateral tabs, a first actuating section of the actuating element can interact with a first lateral tab and a second actuating section of the actuating element can interact with a second lateral tab. Due to the two actuating sections, the actuating element can have a U-shape, wherein an opening in the form of the free space can be formed by the two actuating sections arranged at a distance from one another, through which opening the conductor to be connected and in particular also a subsection of the bus bar can be guided. The two actuating sections can thus prevent a lateral misalignment, both to the right and to the left, of the conductor to be connected. The two actuating sections are preferably designed symmetrically to one another. The two actuating sections are preferably designed to be long enough in the actuating direction of the actuating element so that they, at any point in time, in particular in the open position and in the clamping position of the clamping leg of the clamping spring, can laterally overlap the conductor inserted into the housing and into the conductor connection chamber, so that at any point in time the actuating sections can form a guide and lateral boundary for the conductor to be connected.

In order to be able to hold the actuating element securely and firmly in its position in the open position so that an undesired movement of the actuating element back to the clamping position can be prevented, it can preferably be provided that, to engage the holding element with the actuating element, the actuating element has a latching element and the holding element has a counter-latching element. The latching element and the counter-latching element can engage with one another in a form-fitting manner in the open position of the clamping spring or of the actuating element. For example, the actuating element can have, as a latching element, a recess in which a projection of the holding element can engage as a counter-latching element in the open position, or the holding element can have, as a counter-latching element, a recess in which a projection of the actuating element can engage as a latching element in the open position. In the open position, the actuating element can engage with the holding element in a form-fitting manner. The recess can be designed in the form of an undercut, for example. The projection can be designed, for example, in the form of a forwardly projecting curve. The projection can also be designed as a tab. The shape of the projection is preferably adapted to the shape of the recess in such a way that undesired detachment of the projection from the recess can be prevented. When the projection engages in the recess, a latching can be formed between the actuating element and the holding element.

In order to disengage the holding element from the actuation element, the holding element can be pivotably mounted relative to the actuation element. When the conductor to be connected abuts against the pressure surface of the holding element, the holding element can then be pivoted away from the actuating element in such a way that the holding element disengages from the actuating element and the actuating element can again be freely moved in order to get from the open position into the clamping position.

In order to facilitate the pivoting movement or tilting movement of the retaining element when the conductor to be connected applies a pressing force to the pressure surface of the retaining element, the retaining element can be designed to be spring-elastic at least in some regions. As a result of a spring elasticity of the holding element at least in some regions, the compressive force to be applied by the conductor on the pressure surface in order to release the actuating element from the latching with the holding element can be reduced. In particular, flexible conductors with a small conductor cross-section can thereby also be securely connected with simple handling. The holding element is preferably designed to be spring-elastic in a region which is arranged outside the pressure surface, so that the pressure surface can be designed to be sufficiently dimensionally stable even in case of a spring elasticity of the holding element.

The holding element can, for example, have an elongated shape. The holding element can preferably be of web-shaped design.

The holding element may preferably have a first end section and a second end section, wherein the first end section may be mounted in a force-fit and the second end section may be freely movable relative to the actuating element. A secure, in particular positionally secure, arrangement of the holding element relative to the actuating element can thus be achieved via the first end section. In this case, force-fit means that the first end section is mounted in such a way that the first end section at no time carries out any movement. In contrast to the first end section, the second end section is, however, not mounted in a force-fit but is left free so that the second end section can be moved relative to the actuating element. The pressure surface of the holding element is preferably formed in the region of the second end section. The first end section is preferably formed on the holding element opposite the second end section.

The force-fit of the first end section of the holding element can be formed by a housing of the connection arrangement, wherein the first end section of the holding element can be held clamped in the housing. Due to the clamping mounting of the holding element in the housing, additional fastening means for holding the holding element are not necessary. The holding element can be held clamped between two walls of the housing. The force—it can thus be formed by a clamping mounting of the holding element in the housing. The housing can be designed in such a way that it receives the holding element, the busbar, the clamping spring and the actuating element, wherein the housing can have a conductor insertion opening for inserting the conductor to be connected.

In an embodiment, the invention provides a connecting terminal, in particular a series terminal, which has at least one connection arrangement formed and further developed as described above. The connecting terminal can be arranged, for example, on a circuit board. If the connecting clamp is designed as a series terminal, it can be arranged on a support rail.

Furthermore, a connecting terminal arrangement can be provided which can have a plurality of connecting terminals arranged in a row, each of which can have at least one connection arrangement formed and further developed as described above.

In an embodiment, the invention provides an electronic device which has a connection arrangement formed and further developed as described above or a connecting terminal formed and further developed as described above.

The invention is explained in more detail below with reference to the accompanying drawings on the basis of a preferred embodiment.

FIGS. 1 to 5 show a connection arrangement 100 for connecting an electrical conductor.

The connection arrangement 100 has a housing 10 which can be made of an insulating material.

A conductor connection chamber 11 is formed In the housing 10, within which an electrical conductor inserted into the housing 10 can be clamped and thus electrically connected. For inserting the conductor into the conductor connection chamber 11, the housing 10 has a conductor insertion opening 12 which opens into the conductor connection chamber 11. The conductor to be connected can be inserted into the conductor connection chamber 11 along an insertion direction E via the conductor insertion opening 12.

Arranged In the conductor connection chamber 11 of the housing 10 is a busbar 13 against which the conductor to be connected can be clamped in order to electrically connect the conductor. In order to clamp the conductor to be connected against the bus bar 13, a clamping spring 14 is also arranged in the conductor connection chamber 11.

The clamping spring 14 is designed as a leg spring. The clamping spring 14 has a retaining leg 15, a clamping leg 16 and an arcuate flexural joint 17, wherein the bending joint 17 connects the retaining leg 15 to the clamping leg 16. The retaining leg 15 is arranged in the housing 11 in a fixed position. In contrast, the clamping leg 16 is movable, in particular pivotable, relative to the retaining leg 15. The clamping leg 16, and thus the clamping spring 14, can be moved into an open position and into a clamping position due to the pivotability of the clamping leg 16.

Figure 4:
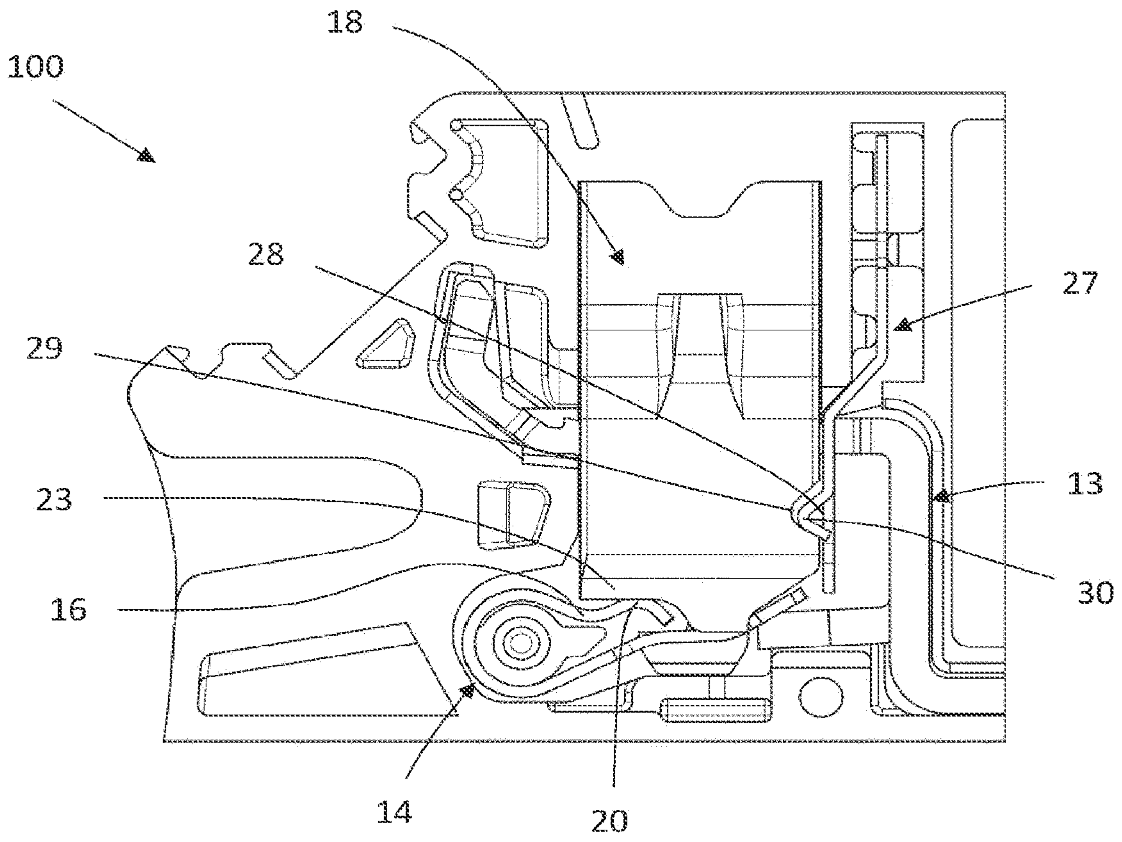
FIG. 4 shows a schematic representation of the connection arrangement shown in FIG. 1 with the clamping spring and the actuating element in an open position.
Figure 5:
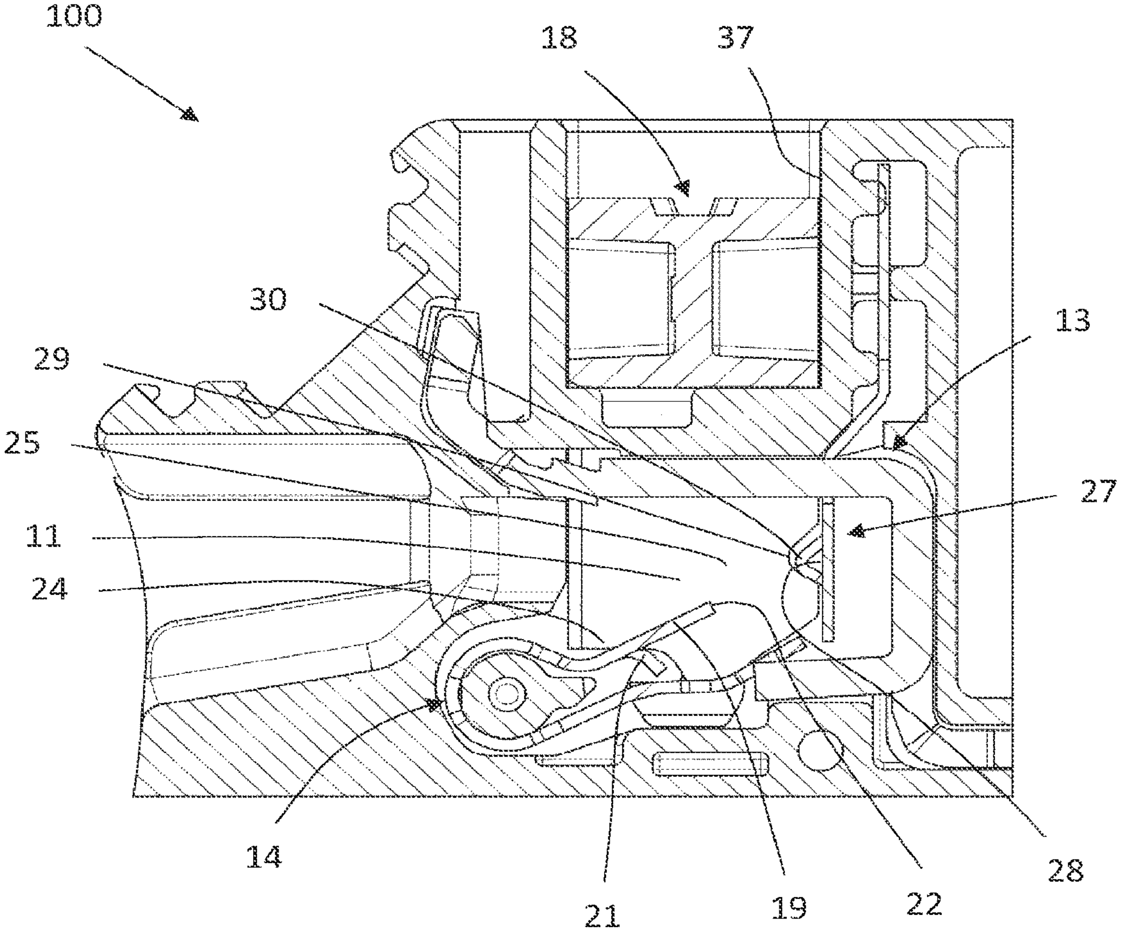
FIG. 5 shows a schematic sectional view of the view of the connection arrangement according to the invention shown in FIG. 4.

In the open position, as shown in FIGS. 4 and 5, the clamping leg 16 is pivoted away from the bus bar 13, so that a free space is formed between the clamping leg 16 and the bus bar 13 into which a conductor to be connected can be inserted.

Figure 2:
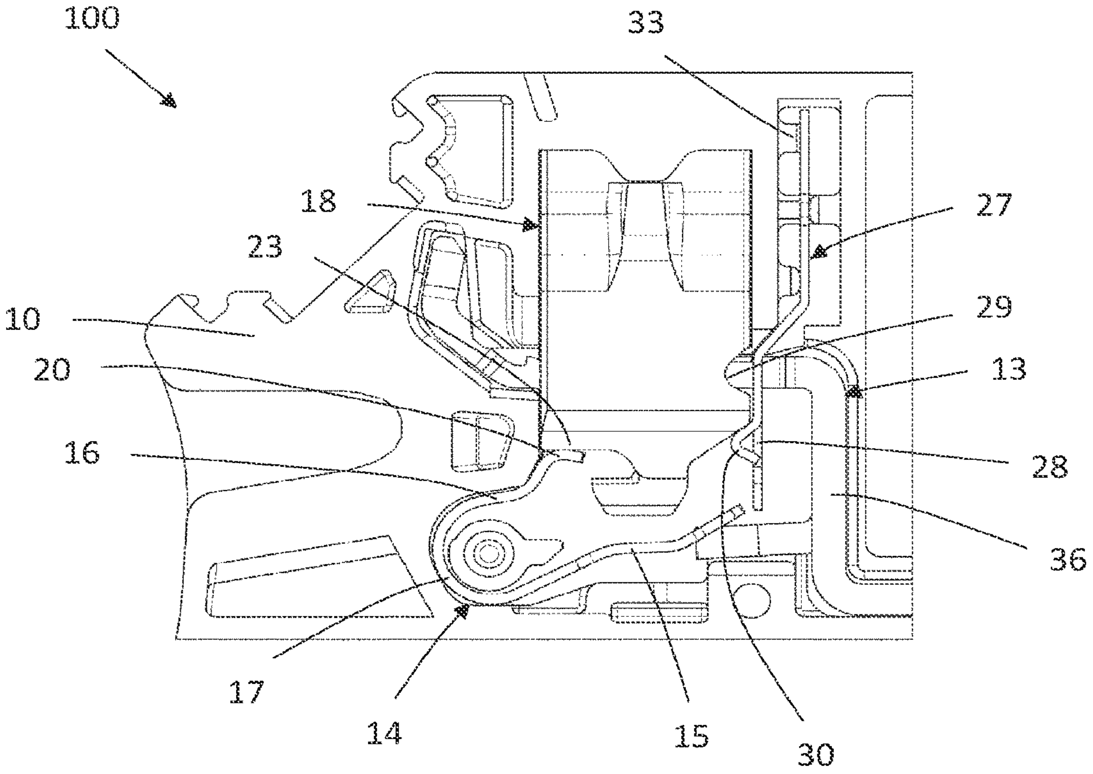
FIG. 2 shows a schematic representation of the system shown in FIG. 1 with the clamping spring and the actuating element in a clamped position without connected conductors.
Figure 3:
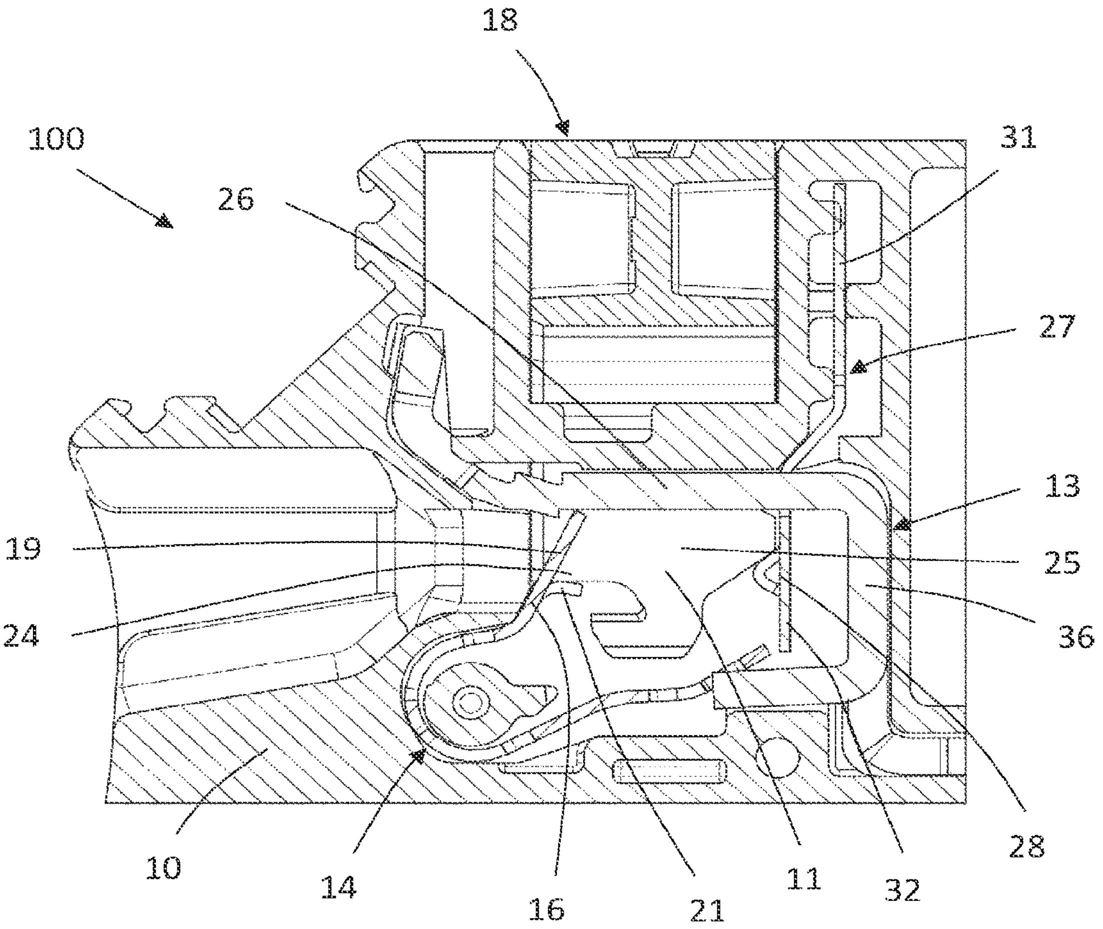
FIG. 3 shows a schematic sectional view of the connection arrangement according to the invention shown in FIG. 2.

In FIGS. 1, 2 and 3, a clamping position of the clamping leg 16 is shown in which the clamping leg 16 itself bears against the bus bar 13 if no conductor is inserted into the conductor connection chamber 11, and when a conductor has been inserted, the clamping leg 16 presses or clamps the conductor 200 against the bus bar 13.

For moving the clamping leg 16 from the clamping position into the open position, an actuating element 18 is provided which is displaceably mounted in the housing 10 along a direction of movement B. When the actuating element 18 is displaced, the actuating element 18 executes a purely translational movement along the direction of movement B and thus along its longitudinal axis. When the clamping spring 14 and thus the clamping leg 16 of the clamping spring 14 is actuated, the actuating element 18 presses from above onto the clamping leg 16 of the clamping spring 14.

The clamping leg 16 of the clamping spring 14 has a clamping tab 19 and two lateral tabs 20, 21 arranged to the side of the clamping tab 19. The clamping tab 19 is arranged between the two lateral tabs 20, 21. A clamping edge 22 is formed at a free end of the clamping tab 19, by means of which the clamping leg 16 and thus the clamping tab 19 bears against the busbar 13 or on the connected conductor in the clamping position.

The clamping leg 16 of the clamping spring 14 is actuated by the actuating element 18 via the two lateral tabs 20, 21 which run parallel to the clamping tab 19 by the actuating element 18 applying a compressive force to the two lateral tabs 20, 21 in the direction of movement B. Preferably, no compressive force is applied to the clamping tab 19 by the actuating element 18.

The clamping tab 19 is designed to be substantially longer than the two lateral tabs 20, 21 so that the clamping tab 19 projects beyond the two lateral tabs 20, 21 in the longitudinal direction of the clamping leg 16.

The lateral tabs 20, 21 are each bent into the shape of a skid. The clamping tab 19, by contrast, has a straight design.

The actuating element 18 has two actuating sections 23, 24 which are arranged parallel to one another and each of which interacts with the two lateral tabs 20, 21. Due to the two actuating sections 23, 24 arranged at a distance from each other, the actuating element 18 has a U-shape, wherein, due to the two actuating sections 23, 24 arranged at a distance from each other, an opening in the form of a free space 25 is formed through which are guided the conductor to be connected and also a partial section 26 of the busbar 13 against which the conductor to be connected is clamped. The clamping tab 19 of the clamping leg 16 also dips into the free space 25 between the two actuating sections 23, 24. The free space 25 is shown in the sectional views of the actuating element 18 in FIGS. 3 and 5.

The two actuating sections 23, 24 can prevent a lateral misalignment of the conductor to be connected both to the right and to the left of the busbar 13. The two actuating sections 23, 24 are designed for this reason to be long enough in the direction of movement B of the actuating element 18 that they, at any point in time, in particular in the open position and in the clamping position of the clamping leg 16 of the clamping spring 14, laterally overlap the conductor inserted into the housing 10 and into the conductor connection chamber 11, so that at any point in time the actuating sections 23, 24 form a guide and lateral boundary for the conductor to be connected.

Furthermore, a holding element 27 is arranged in the housing 10 and engages with the actuating element 18 in the open position of the clamping spring 14 in order to hold the actuating element 18, and thus the clamping spring 14, in the open position, because the actuating element 18 presses on the clamping spring 14.

The holding element 27 has a pressure surface 28 which extends transversely or perpendicularly to the insertion direction E of the conductor into the housing 10. When the conductor is being inserted into the conductor connection chamber 11, the conductor, if it has been pushed in far enough, presses against the pressure surface 28, so that the holding element 27 is moved away from the actuating element 18 and the holding element 27 and thereby disengages from the actuating element 18, so that the latching between the holding element 27 and the actuating element 18 is released. Due to the disengagement, the actuating element 18 can be pressed upward by the compressive force acting on the actuating element 18 from the clamping leg 16, so that the actuating element 18 and thus the clamping spring 14 or the clamping leg 16 of the clamping spring 14 can automatically pivot from the open position into the clamping position in order to be able to clamp the inserted conductor against the busbar 13. The pressure surface 28 is arranged in alignment with the conductor insertion opening 12 and thus in the extension of the conductor insertion opening 12, so that when the conductor is being inserted into the conductor connection chamber 11, the conductor is guided toward the pressure surface 28 of the holding element 27 via the conductor insertion opening 12. In this case, the conductor to be connected is guided through the free space 25 formed in the actuating element 18. The actuating direction R of the pressure surface 28 of the holding element 27 through the to be connected extends parallel to the insertion direction E or in the insertion direction E of the conductor into the housing 10 of the connection arrangement 100.

The holding element 27, and thus also the pressure surface 28 of the holding element 27, is arranged behind the actuating element 18 as viewed in the actuation direction R. The conductor to be connected therefore initially passes through the actuating element 18 by its front end being routed through the actuating element 18 via the free space 25 in the insertion direction E until this front end preferably abuts against the pressure surface 28 of the holding element 27 at a 90° angle.

In this case, the holding element 27 is designed to be spring-elastic, at least in some regions, in order to be able to achieve a pivoting of the pressure surface 28 when a conductor presses against the pressure surface 28. When the conductor abuts against the pressure surface 28 of the holding element 27, there is a pivoting movement of the holding element 27 or of the pressure surface 28 of the holding element 27 relative to the actuating element 18 by the holding element 27 or the pressure surface 28 being pivoted away from the actuating element 28.

In order to be able to achieve a latching connection between the actuating element 18 and the holding element 27 in the open position, the actuating element 18 has a recess 29 in the embodiment shown here. The holding element 27 has a projection 30 facing in the direction of the actuating element 18, which projection 30 can in the open position engage in the recess 29 of the actuating element 18 in a form fitting manner, as shown in FIGS. 4 and 5.

For example, it can be provided that two projections 30 are formed on the holding element 27 and two recesses 29 are formed on the actuating element 18. In each case, one of the two recesses 29 can then be formed on one of the two actuating sections 23, 24 of the actuating element 18, so that each of the two actuating sections 23, 24 can have a recess 29. The two projections 30 are then preferably arranged at a distance from each other in the transverse direction of the holding element 27. The pressure surface 28 of the holding element 27 can be formed between the two projections 30 so that the pressure surface 28 can be limited laterally by the projections 30, in particular as viewed in the transverse direction of the holding element 27 to the right and to the left.

The holding element 27 can be formed from a spring plate. In order to form the projection 30, the spring plate can have two punched tabs which are bent such that they form protrusions 30 pointing in the direction of the actuating element 18. The projections 30 may, for example, each have a V-shape.

The holding element 27 has a first end section 31 and a second end section 32.

The holding element 27 is mounted on the housing 10 in a force-fit via the first end section 31 by the first end section 32 being arranged in a recess 33 of the housing 10 and being held clamped between the walls 34, 35 of the recess 33 that bound the recess 33.

In contrast, the second end section 32 of the holding element 27 is mounted so as to be freely movable relative to the actuating element 18. The pressure surface 28 is formed on the second end section 32. Furthermore, the protrusion 30 is formed on the second end section 32. Here, the holding element 27 is arranged with its second end section 32 between the actuating element 18 and a further subsection 36 of the busbar 13. This subsection 36 extends perpendicularly to the subsection 26 of the busbar 13 against which the conductor to be connected can be clamped.

The housing 10 has a channel 36 in which the actuating element 18 is guided. The channel 37 extends substantially perpendicularly to the conductor insertion opening 12. Both the channel 37 and the conductor insertion opening 12 open into the conductor connection chamber 11.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Connecting terminal
10 Housing
11 Conductor connection chamber
12 Conductor insertion opening
13 Busbar
14 Clamping spring
15 Retaining leg
16 Clamping leg
17 Bending joint
18 Actuating element
19 Clamping tab
20 Lateral tab
21 Lateral tab
22 Clamping edge
23 Actuating section
24 Actuating section

25 Free space
26 Subsection
27 Holding element
28 Pressure surface
29 Recess
30 Projection
31 First end section
32 Second end section
33 Recess
34 Wall
35 Wall
36 Subsection
37 Channel
B Direction of movement
E Insertion direction
R Actuating direction

The invention claimed is:

1. A connection arrangement for connecting an electrical conductor, comprising:

a busbar;

a clamping spring by which the conductor to be connected is clamped in a clamping position of the clamping spring against the busbar;

an actuating element by which the clamping spring can be moved from the clamping position into an open position; and a holding element which, in the open position, engages with the actuating element to hold the actuating element in position, wherein the holding element has a pressure surface, wherein, for moving the clamping spring from the open position into the clamping position, the pressure surface can be actuated by the conductor to be connected and the holding element can be disengaged from the actuating element by the actuation of the pressure surface, and wherein the holding element is resiliently rotatable relative to the actuating element.

2. The connection arrangement according to claim 1, wherein the actuating element for moving the clamping spring into the clamping position and into the open position can be guided along a direction of movement, which runs transversely to an actuating direction of the pressure surface of the holding element through the conductor to be connected.

3. The connection arrangement according to claim 2, wherein the pressure surface of the holding element is arranged behind the actuating element in the actuating direction.

4. The connection arrangement according to claim 3, wherein the actuating element has a free space for leading the conductor to be connected through toward the pressure surface of the holding element.

5. The connection arrangement according to claim 1, wherein the clamping spring has a clamping leg with a clamping tab and with at least one lateral tab arranged laterally to the clamping tab, wherein a clamping edge for clamping the conductor against the busbar is formed at a free end of the clamping tab, and wherein the actuating element interacts with the at least one lateral tab to actuate the clamping spring.

6. The connection arrangement according to claim 5, wherein the clamping tab projects beyond the at least one lateral tab in a longitudinal direction of the clamping leg.

7. The connection arrangement according to claim 5, wherein the clamping leg has two lateral tabs arranged to the side of the clamping tab, wherein the actuating element has two actuating sections which interact with the two lateral tabs to actuate the clamping spring, and wherein a free space for guiding the conductor to be connected is formed between the two actuating sections.

8. The connection arrangement according claim 1, wherein the actuating element has a recess for engaging the holding element with the actuating element, in which recess a projection of the holding element engages in the open position, or the holding element has a recess in which a projection of the actuating element engages in the open position.

9. The connection arrangement according to claim 1, wherein the holding element has a first end section and a second end section, and wherein the first end section is mounted in a force-fit and the second end section is freely movable relative to the actuating element.

10. The connection arrangement according to claim 9, wherein the force-fit of the first end section of the holding element is formed by a housing of the connection arrangement, and wherein the first end section of the holding element is held clamped in the housing.

11. A connecting series terminal having at least one connection arrangement according to claim 1.

12. An electronic device, comprising:

the connecting terminal according to claim 11.

13. A connection arrangement for connecting an electrical conductor, comprising:

a busbar;

a clamping spring by which the conductor to be connected is clamped in a clamping position of the clamping spring against the busbar;

an actuating element by which the clamping spring can be moved from the clamping position into an open position; and a holding element which, in the open position, engages with the actuating element to hold the actuating element in position, wherein the holding element has a pressure surface, wherein, for moving the clamping spring from the open position into the clamping position, the pressure surface can be actuated by the conductor to be connected and the holding element can be disengaged from the actuating element by the actuation of the pressure surface, and wherein the holding element is designed to be spring-elastic at least in sections.

14. The connection arrangement according to claim 13, wherein the actuating element for moving the clamping spring into the clamping position and into the open position can be guided along a direction of movement, which runs transversely to an actuating direction of the pressure surface of the holding element through the conductor to be connected.

15. The connection arrangement according to claim 14, wherein the pressure surface of the holding element is arranged behind the actuating element in the actuating direction.

16. The connection arrangement according to claim 15, wherein the actuating element has a free space for leading the conductor to be connected through toward the pressure surface of the holding element.

17. The connection arrangement according to claim 13, wherein the clamping spring has a clamping leg with a clamping tab and with at least one lateral tab arranged laterally to the clamping tab, wherein a clamping edge for clamping the conductor against the busbar is formed at a free end of the clamping tab, and wherein the actuating element interacts with the at least one lateral tab to actuate the clamping spring.

18. The connection arrangement according to claim 17, wherein the clamping tab projects beyond the at least one lateral tab in a longitudinal direction of the clamping leg.

19. The connection arrangement according to claim 17, wherein the clamping leg has two lateral tabs arranged to the side of the clamping tab, wherein the actuating element has two actuating sections which interact with the two lateral tabs to actuate the clamping spring, and wherein a free space for guiding the conductor to be connected is formed between the two actuating sections.

20. The connection arrangement according claim 13, wherein the actuating element has a recess for engaging the holding element with the actuating element, in which recess a projection of the holding element engages in the open position, or the holding element has a recess in which a projection of the actuating element engages in the open position.

21. The connection arrangement according to claim 13, wherein the holding element has a first end section and a second end section, and wherein the first end section is mounted in a force-fit and the second end section is freely movable relative to the actuating element.

22. The connection arrangement according to claim 21, wherein the force-fit of the first end section of the holding element is formed by a housing of the connection arrangement, and wherein the first end section of the holding element is held clamped in the housing.

23. A connecting series terminal having at least one connection arrangement according to claim 13.

24. An electronic device, comprising:

the connecting terminal according to claim 23.

* * * * *